J. EDSON & WILLIAM G. BELL.
Improvement in Sausage Fillers.
No. 122,941. Patented Jan. 23, 1872.
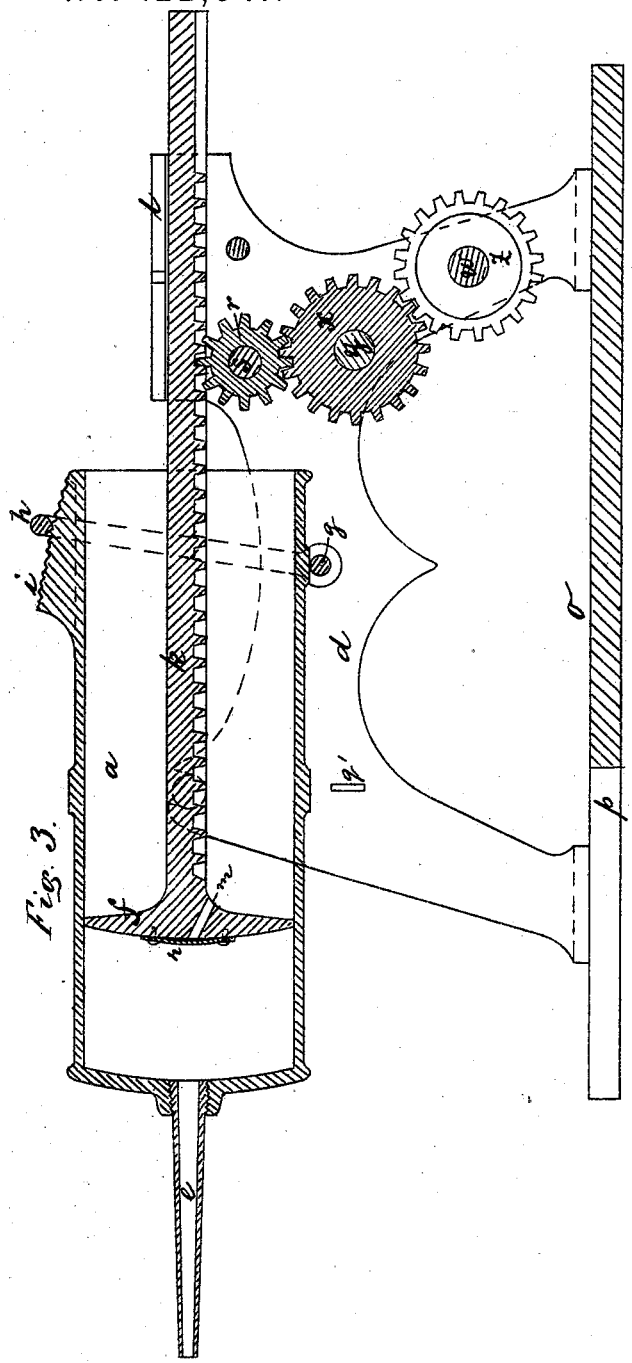
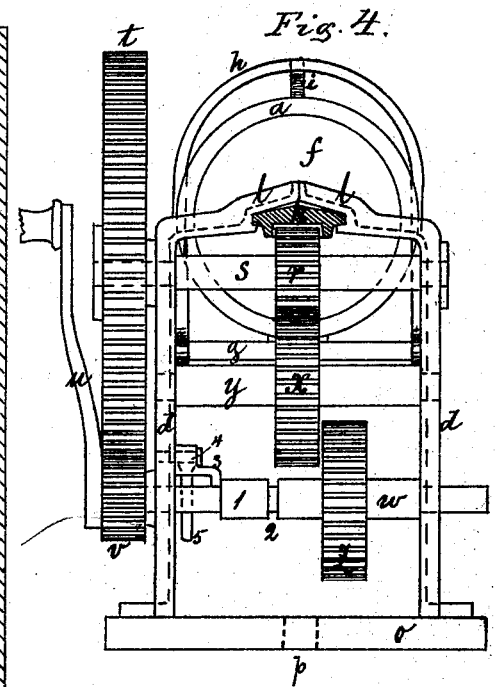
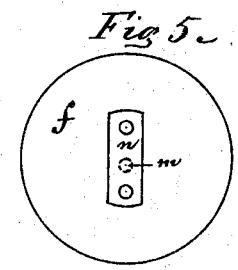

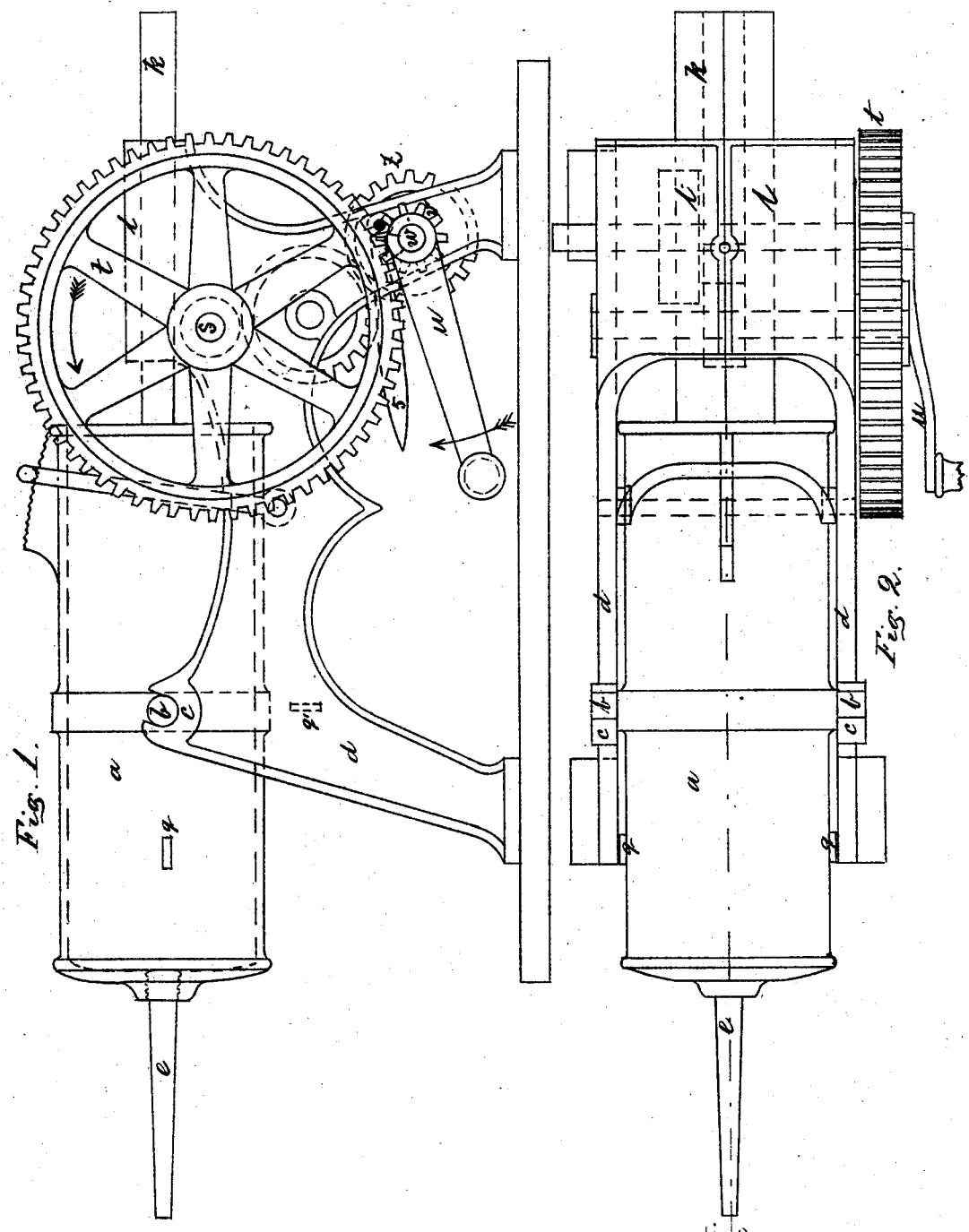

122,941

UNITED STATES PATENT OFFICE.

JACOB EDSON AND WILLIAM GIBSON BELL, OF BOSTON, MASSACHUSETTS.

IMPROVEMENT IN SAUSAGE-FILLERS.

Specification forming part of Letters Patent No. 122,941, dated January 23, 1872.

We, JACOB EDSON and WILLIAM GIBSON BELL, of Boston, in the county of Suffolk and State of Massachusetts, have jointly invented certain new and useful Improvements on Sausage-Fillers, of which the following is a specification:

Nature and Objects of the Invention.

The nature of our invention relates to certain improvements on that class of sausage-fillers where a piston is used to press the chopped meat through the end of a cylinder in which the chopped meat is placed, for the purpose of filling sausages, as will now be fully shown and described.

On the drawing, Figure 1 is a side view of the machine; Fig. 2 is a ground plan; Fig. 3 is a central longitudinal section over the line A B, taken on Fig. 2; Fig. 4 is a rear end view; and Fig. 5 is an end view of the piston.

Similar letters refer to similar parts wherever they occur in the different parts on the drawing.

The drawing is made in one quarter of full size, but we may also make our machines larger or smaller, as may be required.

$a$ is the cylinder in which the chopped meat is placed. The cylinder $a$ is provided with two trunnions, $b\ b$, on which said cylinders can be hung in bearings $c\ c$ attached to the upper part of the side frames $d\ d$, as shown. The forward end of the cylinder $a$ is provided with the pipe $e$ through which the meat is pressed into the cases used as a covering for the sausages. The opposite end of the cylinder $a$ is open, so that the piston $f$ can be drawn out from it when the cylinder is to be filled. The cylinder $a$ is held firmly in place during the operation by resting on the cross-bar $g$, that also holds the frames $d\ d$ together. Around the brace $g$ is a band or shackle, $h$, made to swing, the upper part of which clamps on a toothed cam, $i$, attached to the upper side of the cylinder $a$, as fully shown in Figs. 1, 3, and 4. The toothed rack $k$ is made in one piece with the piston $f$, and is guided in bearings $l\ l$, each of which is cast in one piece with one of the side-frames $d\ d$, as shown in Fig. 4, by which arrangement we are able to provide substantial bearings or guides for the rack $k$ at a small expense, and more compact than if we employed separate guides bolted or otherwise connected to the side frames $d\ d$, as formerly done. The head $f$ is perforated with a hole, $m$, that is covered with an elastic cover, $n$, attached to the head $f$ by screws or rivets, as shown, the object of which is to allow the air to pass through said piston $f$ when the rack $k$ is drawn out from the cylinder $a$, and thus prevent a vacuum in the forward end of the cylinder that otherwise would exist, as the pipe $e$ is generally filled solid with the chopped meat through which the air cannot pass freely. By the employment of the hole $m$ in the piston $f$ we are also able to draw the said piston out from the cylinder $a$, for the purpose of re-filling the machine, with considerable less power than we could do if no such vent-hole was used. Small ears $q\ q$ are attached to each opposite side of the cylinder $a$, and similar ears $q'\ q'$ attached to the inside of the frames $d\ d$, by which arrangement the cylinder $a$ is prevented from swinging over the center when placed in a vertical position. The rack $k$ is operated by means of the pinion $r$ secured to the shaft $s$, on the outer end of which the spur-wheel $t$ is keyed; Said spur-wheel $t$ is operated by means of the pinion $v$ and crank $u$ secured to the shaft $w$, as shown. An intermediate gear, $x$, secured to the shaft $y$ and running loose in bearings in the frames $d\ d$, is made to engage with the pinion $r$. On the shaft $w$ is also secured a secondary spur-wheel, $z$, that can be made to engage with the intermediate gear $x$ for the purpose of drawing out the piston $f$ from the cylinder $a$ with greater speed than what it is pressed forward with. For this purpose we give to the shaft $w$ a lateral motion in its bearings, so that when we wish to press the piston $f$ forward we place the shaft $w$ with its pinions $v$ and $z$ in a position as shown on Fig. 4, by which arrangement the pinion $v$ engages with the wheel $t$, but no engagement takes place between the wheels $x$ and $z$.

When the cylinder $a$ is emptied and the piston $f$ is to be drawn back quickly we disengage the wheels $t$ and $v$ from each other, and engage the wheels $x$ and $z$ with each other, by giving a lateral motion to the shaft $w$, by which arrangement we can draw out the piston $f$ and rack $k$ very quickly, and in such a manner that we need not change the direction of the crank, whether we push the piston $f$ forward or draw it out from the cylinder $a$.

For the purpose of holding the shaft $w$ in its two respective positions we provide it with a collar, 1, and circular groove 2, as shown on Fig. 4. A shipper, 3, movable around a pin, 4, secured to the frame $d$ and provided with a handle, 5, can be operated so as to face the collar 1, as shown in Fig. 4, when the wheels $v$ and $t$ are engaged, or operated so that the finger 3 can rest in the groove 2 when an engagement takes place between the wheels $x$ and $z$, and the wheels $v$ and $t$ are disengaged for the purpose as heretofore described.

To operate our machine we draw the rack $k$ out from the cylinder $a$ by turning the crank $u$ and engaging the wheels $z\ x$ and $r$ with the toothed rack $k$, till the piston is completely out from the cylinder $a$. When we loosen the hold of the clamp $h$ on the cam $i$, the cylinder can easily be swung to a vertical position on the trunnions $b\ b$. We then fill the cylinder with the chopped meat, and replace the cylinder in its original position and clamp it firmly therein by means of the shackle $h$ and cam $i$. After putting the cases over the pipe $e$ we press the piston forward by means of the crank $u$, pinion $v$ engaging with the wheel $t$, and pinion $r$ acting upon the rack $k$, as heretofore described.

Having thus fully described the nature, construction, and operation of our invention, we wish to secure by Letters Patent, and claim—

1. The arrangement of the cylinder $a$, toothed rack $k$, guides $l\ l$, cast in one piece with the sides $d\ d$, as and for the purpose set forth.

2. The vent-hole $m$, and elastic cover $n$, in combination with the piston $f$ and cylinder $a$, for the purpose set forth.

3. The clamp $h$ and toothed cam $i$, in combination with the cylinder $a$ and frames $d\ d$, for the purpose set forth and described.

4. The arrangement of the pinions $r, x, z$, and $v$, the shaft $w$ with its collar 1 and groove 2, and the shipper 3 5, in combination with the cylinder $a$ and rack $k$, as and for the purpose as herein fully set forth and described.

JACOB EDSON.
WM. GIBSON BELL.

Witnesses:
ALBAN ANDRÉN,
GALEN COFFIN.